United States Patent [19]

Harris et al.

[11] Patent Number: 4,609,714

[45] Date of Patent: Sep. 2, 1986

[54] BLENDS OF POLY(ARYL KETONES)

[75] Inventors: James E. Harris, Piscataway; Lloyd M. Robeson, Whitehouse Station, both of N.J.

[73] Assignee: Union Carbide Corporation, Danbury, Conn.

[21] Appl. No.: 650,100

[22] Filed: Sep. 14, 1984

Related U.S. Application Data

[63] Continuation-in-part of Ser. No. 536,834, Sep. 24, 1983, abandoned.

[51] Int. Cl.[4] .................. C08L 61/00; C08L 71/00
[52] U.S. Cl. ................................. 525/471; 525/534
[58] Field of Search .................. 525/471, 534; 252/1

[56] References Cited

FOREIGN PATENT DOCUMENTS 0008895 3/1980 European Pat. Off. ............ 525/471

OTHER PUBLICATIONS

Attwood et al., *Polymer Reprints*, 20, No. 1, Apr. 1979, pp. 191–199.
Attwood et al., *Polymer*, vol. 22, Aug. 1981, pp. 1096–1103.

*Primary Examiner*—Allan M. Lieberman
*Attorney, Agent, or Firm*—Donald M. Papuga

[57] ABSTRACT

Described herein are blends of at least two separately made crystalline polyarylether resins formed into an intimate moldable mixture, each resin having, prior to being formed into said mixture (i) a different crystalline melting temperature and a different glass transition temperature, of (ii) a different molecular arrangement of unit components each resin comprising 1,4 phenylene units separated by ether oxygen and at least one of said resins containing 1,4-phenylene unit separated by a divalent carbonyl radical.

23 Claims, No Drawings

BLENDS OF POLY(ARYL KETONES)

RELATED APPLICATION

This application is a continuation-in-part application of Ser. No. 536,834 filed on Sept. 24, 1983, in the name of J. E. Harris et al and titled Blends of Poly(aryl ketones), and which is now abandoned.

STATEMENT OF INVENTION

The invention relates to tough, crystalline, thermoplastic poly(aryl ether) blends which comprise at least two separately made crystalline poly(aryl ether) resins formed into an intricate moldable mixture. These blends possess in the molded state excellent mechanical compatibility and provide a broader range of use temperatures and processability than the unblended constituents. A preferred class of the blends possess the rare quality of isomorphism in the molded state as evidenced by a single crystalline melting point ($T_m$) and a single glass transition temperature ($T_g$) intermediate of at least two of the resins in the blend.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (viz. Friedel-Crafts catalyzed) reaction of aromatic diacylhalides with unsubstituted aromatic compounds such as diphenyl ether. The evolution of this class to a much broader range of PAEs was achieved by Johnson et al., Journal of Polymer Science, A-1, vol. 5, 1967, pp. 2415–2427, Johnson et al., U.S. Pat. Nos. 4,108,837, and 4,175,175. Johnson et al. show that a very broad range of PAES can be formed by the nucleophilic aromatic substitution (condensation) reaction of an activated aromatic dihalide and an aromatic diol. By this method, Johnson et al. created a host of new PAEs including a broad class of poly(aryl ether ketones), hereinafter called "PAEK".

In recent years, there has developed a growing interest in PAEKs as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Attwood et al., Polymer, 1981, vol 22, August, pp. 1096-1103; Blundell et al., Polymer, 1983 vol. 24, August, pp. 953-958, Attwood et al., Polymer Preprints, 20, no. 1, April 1979, pp. 191-194; and Rueda et al., Polymer Communications, 1983, vol. 24, September, pp. 258-260. In recent years, Imperial Chemical Industries, LTD (ICI) has been offering commercially a PAEK called Victrex (a trademark of ICI) PEEK. As PAEK is the acronym of poly(aryl ether ketone), PEEK is the acronym of poly(ether ether ketone) in which the phenylene units in the structure are assumed.

According to Attwood et al., Polymer, 1981, supra, the PAEKs formed by electrophilic and nucleophilic aromatic substitution have a tendency to possess branching, the degree of branching being determined by the process employed. Branching is the essential phenomena being minimized in Dahl, U.S. Pat. No. 4,247,682, Agolino, U.S. Pat. No. 3,668,057, and Angelo et al., U.S. Pat. No. 3,767,620.

Thus PAEKs are well known; they can be made from a variety of starting materials; and they can be made with different melting temperatures and molecular weights. Nominally, PAEKs are crystalline and can be made tough, i.e., exhibit high values (>50 ft-lbs/in$^2$) in the tensile impact test (ASTM D-1822). They have potential for a wide variety of uses, but because of the significant cost to manufacture them, they are extremely expensive polymers. Their favorable properties classes them with the best of the engineering polymers.

Polymer blends have been widely taught and employed in the art. As broad as this statement may be, the blending of polymers remains an empirical art and the selection of polymers for a blend giving special properties is, in the main, an Edisonian-like choice. Certain attributes of polymer blends are more unique than others. The more unique attributes when found in a blend tend to be unanticipated properties.

(A) According to Zoller and Hoehn, Journal of Polymer Science, Polymer Physics Edition, vol. 20, pp. 1385–1397 (1982)

"Blending of polymers is a useful technique to obtain properties in thermoplastic materials not readily achieved in a single polymer. Virtually all technologically important properties can be improved in this way, some of the more important ones being flow properties, mechanical properties (especially impact strength), thermal stability, and price.

... Ultimately, the goal of such modeling and correlation studies should be the prediction of blend properties from the properties of the pure components alone. We are certainly very far from achieving this goal."

In the field of miscibility or compatibility of polymer blends, the art has found predictability to be unattainable, even though considerable work on the matter has been done. According to authorities:

(B) "It is well known that compatible polymer blends are rare." Wang and Cooper, Journal of Polymer Science, Polymer Physics Edition, vol. 21, p. 11 (1983).

(C) "Miscibility in polymer-polymer blends is a subject of widespread theoretical as well as practical interest currently. In the past decade or so the number of blend systems that are known to be miscible has increased considerably. Moreover, a number of systems have been found that exhibit upper or lower critical solution temperatures, i.e., complete miscibility only in limited temperature ranges. Modern thermodynamic theories have had limited success to date in predicting miscibility behavior in detail. These limitations have spawned a degree of pessimism regarding the likelihood that any practical theory can be developed that can accommodate the real complexities that nature has bestowed on polymer-polymer interactions." Kambour, Bendler, Bopp. Macromolecules, 1983, 16, 753.

(D) "The vast majority of polymer pairs form two-phase blends after mixing as can be surmised from the small entropy of mixing for very large molecules. These blends are generally characterized by opacity, distinct thermal transitions, and poor mechanical properties. However, special precautions in the preparation of two-phase blends can yield composites with *superior* mechanical properties. These materials play a major role in the polymer industry, in several instances commanding a larger market than either of the pure components." Olabisi, Robeson and Shaw, Polymer-Polymer Miscibility, 1979, published by Academic Press, New York, N.Y., p. 7.

(E) "It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty, for example, see P. J. Flory, *Principles of Polymer Chemistry*, Cornell University Press, 1953, Chapter 13, page 555." Younes, U.S. Pat. No. 4,371,672.

(F) "The study of polymer blends has assumed an ever-increasing importance in recent years and the resulting research effort has led to the discovery of a number of miscible polymer combinations. Complete miscibility is an unusual property in binary polymer mixtures which normally tend to form phase-separated systems. Much of the work has been of a qualitative nature, however, and variables such as molecular weight and conditions of blend preparation have often been overlooked. The criteria for establishing miscibility are also varied and may not always all be applicable to particular systems." Saeki, Cowie and McEwen, Polymer, 1983, vol. 24, January, p. 60.

Miscible polymer blends are not common, and those of different PAEs and PAEKs are unique to most uncommon. However rarified the phenomena miscibility may be, even more so is the phenomena of isomorphism. According to Allegra and Bassi, Adv. Polymer Sci., vol. 6, pp. 549-574 (1959) in their article entitled "Isomorphism in Synthetic Macromolecular Systems"

"Isomorphism in macromolecular systems may be defined as the statistical substitution, within a single crystalline phase, between monomer units differing either in chemical structure or in conformation or in configuration. The distribution of the different monomer units needs not to be totally random. As we shall see, there are examples of isomorphous systems consisting of a mixture of different homopolymer chains. In these cases the randomness is confined to the macromolecules and is not extended to the monomer units by themselves. There are systems containing two (or more) types of monomer units where a unique crystal structure is observed for every composition. In other cases more than one crystalline phase containing both types of units is detected, depending on the composition and/or thermal or mechanical treatments. Following NATTA we shall indicate the phenomenon of the first type as *isomorphism in a strict sense* and that of the second type as *isodimorphism* or *isopolymorphism*. It is apparent that our introductory definition of isomorphism is general in that it applies to both cases; in the general meaning we will also use the equivalent terms *isomorphous replacement* and *cocrystallization*.

Bunn and Peiser first recognized macromolecular isomorphism in synthetic materials in the case of the ethylene/vinyl alcohol copolymers and in polyvinylalcohol itself. Successively, they suggested this possibility also for natural rubber. Subsequently, many other examples of macromolecular isomorphism were described. We shall see in the following that they refer mainly to stereoregular vinyl polymers and copolymers, fluorinated polymers and copolymers, copolyamides, and polyesters. In this review we shall refer only to synthetic materials, excluding therefore such important examples of isomorphism as those occurring in polypeptides and polynucleotides." (pp. 549,550)

At p. 550, Allegra et al. set forth requirements for isomorphism as follows:

"The most important conditions to be fulfilled in order to have isomorphism in a macromolecular system are:

(i) the different types of monomer units must approximately have the same shape, and occupy the same volume, and (ii) the same chain conformation must be compatible with either of them."

According to Attwood et al., Polymer, 1981 p. 1102, supra PAEKs $T_m$ and $T_g$ increase "as the ratio of carbonyl to ether linkages increase(s):

"***as would be expected from the greater polarity of the carbonyl group; the high $T_m$ of polymer VIII is due to increased chain rigidity introduced via the biphenylene group. It is surprising that those polymers containing only carbonyl and ether inter-ring linkages (all except VIII and IX in Table 8) should have the same crystal structure, for their chemical repeat units differ substantially, especially in length. However, the unit cell of polymer III has been determined by X-ray diffraction and the fibre repeat distance found to be 10.0 A. This does not correspond to the chemical repeat unit, but to a shorter unit consisting of two phenylene rings joined either by two ether links or one ether and one carbonyl (FIG. 2). All bonds in the linking groups lie in the same plane and the average angle between bonds linking phenylene rings is ~1240. Thus, in this polymer and all the others in Table 8 containing only ether and carbonyl linkages between the rings these linkages are stereochemically equivalent to such an extent that the polymers have virtually the same crystal structure. Polymer VIII, although well crystalline, does not have the same crystal structure. This is not surprising as the presence of direct inter-ring linkages must alter the chain conformation."

Accordingly, Dawson and Blundell, Polymer, 1980, vol. 21, 577–578, at 578, assume that the cited PAEKs, because of:

"The similarity of the unit cell and of the chain conformations of these polymers strongly suggest that the crystal structure of Boon et al. for poly(phenylene oxide) is also a good model for the present aryl ether ketone polymers."

However, Allegra et al, supra, at p. 567, in discussing isomorphism of macromolecules with different chemical constitution find that "[i]n addition to the general steric requirements reported in the introductory section for macromolecular isomorphism, if chains differ in chemical structure, they must also show some degree of compatibility* to intimate mixing and not too much different crystallization kinetics. The first condition is strictly similar to the one that applies to liquid mixtures. As a well known example, liquids without reciprocal affinity in general cannot form a unique phase. Attempts to obtain mixed crystals from polyethylene and polyvinyl or polyvinylidene fluoride has been unsuccessful hitherto, in spite of the similarity in shape and size of their chains. *In view of the above somewhat strict requirements, it is not* suprising that *relatively few examples of this type of isomorphism have been reported.*" (emphasis added)

*In this instance the authors are using "compatibility" where miscibility is believed to be the intended word. Miscibility means a homogeneous mixture whereas compatibility means useful properties when mixed and molded.

This, of course, established the non-congruity of attempting to draw conclusions about mixed polymer isomorphism discussed by Allegra et al (p. 567) and the unit cell and chain conformation similarities noted for some PAEKs homopolymers and copolymers by Dawson and Blundell, supra, and Attwood et al., Polymer Preprints, supra, at page 194.

The complexity of prognosis of miscibility or compatibility, indeed of the kind denoting isomorphism, for any blends of PAEKs is made more so by the issue of branching inherent to varying degrees in PAEKs. Compare the result from blending low density polyethylene with high density polyethylene. There the degree of branching is the only molecular difference and mixtures of them are not isomorphic.

Moreover, prior data noting the very rare case of random copolymer isomorphism as compared with polymer blend isomorphic behavior have noted different melting temperature composition data (Natta et al, Journal of Polymer Science, Part A3, 4263 (1965)). Indeed, Allegra et al., supra, have classed them differently. As with many other properties (e.g. miscibility, transparency, etc.) random copolymers generally exhibit widely different properties than blends of the polymers based on the individual monomer constituents of the copolymer (e.g. comparison of styrene-acrylonitrile copolymer properties with those of polystyrene/polyacrylonitrile blends).

THE INVENTION

This invention is directed to polyarylether (PAE) resin blends which comprise at least two separately made crystalline polyarylether resins formed into an intimate moldable mixture. Each resin has, prior to being formed into said mixture, (i) a different crystalline melting temperature and a different glass transition temperature, or (ii) a different molecular arrangement of unit components. Each resin comprises 1,4-phenylene units separated by ether oxygen and at least one of said resins containing 1,4 phenylene unit separated by a divalent carbonyl radical.

In the foregoing, PAEK is considered a subgenus of PAE.

PAEKs which may be used herein are characterized as containing the repeating unit

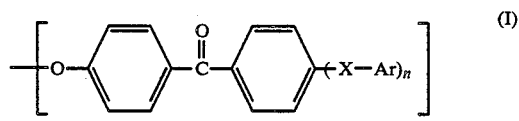

wherein Ar is independently a divalent aromatic radical selected from phenylene, biphenylene or naphthylene, X is independently O,

or a direct bond and n is an integer of from 0 to 3.

Such PAEK structures when made separately and when encompassing features (i) and/or (ii) above can be employed in the practice of this invention.

DISCUSSION OF THE INVENTION

The PAEKs are normally crystalline, thermoplastic polymers. Those PAEKs wherein the ether and ketone groups are separated by 1,4-phenylene groups are highly crystalline, possessing crystalline melting temperatures ($T_m$) typically in excess of 285° C. up to about 425° C. As pointed out previously (see Attwood et al, Polymer, 1981, supra), when the ketone to ether ratio in the polymer goes up, so does the polymers $T_m$ and $T_g$.

These thermoplastic polymers are primarily employed in making injection molded articles. Other molding methods such as transfer molding may be used to make molded articles from the resin blends of this invention. However, in injection molding the temperatures employed are nominally about 40° C. above the $T_m$ of the polymer having the highest $T_m$ in the blend or, when the blend is an isomorphic mixture, about 40° C. above the $T_m$ of the polymer blend. There is a natural limit to using these blends in molding especially injection molding.

It has been found that all of the PAEKs start to deleteriously degrade at temperatures of about 450° C. under typical injection molding cycles. Couple that fact with the fact that commercial injection molding requires a molding latitude of about 40° C., a somewhat lower $T_m$ than the maximum $T_m$ attainable for PAEKs is a practical limit in respect to the kind of PAEK one can commercially employ. Consequently, in employment of certain known PAEKs having high ketone to ether ratios, their $T_m$ precludes their use alone in injection molding applications.*

*This phenomena of polymer degradation is, in a fashion, addressed by Dahl et al., U.S. Pat. No. 3,956,240, where they found, in the case of compression molding of the polymer of the structure

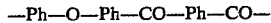

(wherein Ph is 1,4-phenylene), the "slabs exhibited excessive gel content, indicative of a substantial degree of thermal crosslinking during melt processing."

However, this invention allows the use of such PAEKs with high $T_m$'s by blending them with PAEKs having lower $T_m$'s. If the blend of resin forms an isomorphic mixture on molding then the isomorphic mixture can be made to have a single $T_m$ within a range which may be close to the optimum maximum for the molding cycle. Of course, even lower $T_m$ blends can be made and used in a practical fashion to make molded articles.

This invention encompasses two (2) types of blends of PAEs. In the preferred embodiment, this invention encompasses two (2) types of blends of PAEKs.

The first type to be discussed is where the blend on molding forms a heterogeneous or immiscible resin molded article comprising individualistic $T_m$'s reflective of each PAE or PAEK resin employed in the blend. The second type to be discussed is where the blend on molding forms a homogeneous or miscible resin molded article which is isomorphic and possesses a single $T_m$ and $T_g$. There are PAE (or PAEK) blends wherein the molded article possesses a broad $T_m$, and exhibits properties in between both types of blends. It is not appreciated whether this latter version is reflective of an immiscible or miscible blend (isomorphic). One can view this latter type as being in either of the types of blends, but for the purpose of this invention they will be classed as being miscible (isomorphic) blends.

THE IMMISCIBLE PAE OR PAEK BLENDS

The immiscible blends of this invention form mechanically compatible* melt molded articles in which there are more than one $T_m$ for the article. The blends themselves may be powder mixtures which when melt molded are macroscopically homogeneous but are microscopically essentially heterogeneous. Immiscible PAE and/or PAEK blends form molded articles which provide a number of advantages over the use of a single PAE or PAEK resin.

*As used by Olabisi et al., supra.

The immiscible blends of this invention exhibit unique properties such as enhanced cut-through temperature (ASTM D-1676—sections 80-86), indicating that they are more desirable for use in electrical wire and connector applications, and enhanced resistance to deformation in a no load situation (e.g., as determined by the Vicat softening point of plastics (ASTM D-1525)), which suggests that they have unique applications in dielectric circuit boards exposed to extremely broad temperature excursions, and in making filament or fibers suitable for high temperature applications. Because blends can be made in which at least one of the resins has a high ether content, viz. a PAE composed of only 1,4-phenylene and ether oxygen, or a PAEK having a relatively low ketone content, it is within the contemplation of the invention to make molded articles or coating which possess enhanced caustic resistance (ASTM D-543). Homopolymers and copolymers alone do not provide the benefits of both high $T_m$ and caustic resistance, whereas the blends can provide both high $T_m$ and caustic resistance.

The immiscible polymer blends can be used to make shaped articles (films, coatings, etc.) at temperatures above the $T_m$ of the lower melting ($T_m$) resin but below the $T_m$ of the higher melting ($T_m$) resin under high stress conditions (e.g. crimping). In addition, the immiscible polymer blends exhibit enhanced thermal deformation resistance (under low stress loading) because the blend allows the presence of an exceptionally high $T_m$ resin.

The uses for and properties of the immiscible polymer blends ar more varied than can be achieved with solitary resins regardless of whether the solitary resin is a homopolymer or copolymer. The versatility afforded by such resins is unique and provides applications for PAEs and/or PAEKs heretofore not considered available.

THE MISCIBLE PAE AND PAEK BLENDS

The miscible blends of this invention exhibit the rare phenomenon called isomorphism. The exhibition of isomorphism is dependent upon the criteria of Allegra et al., to wit: the monomer units must approximately have the same shape, and occupy the same volume; the same chain conformation must be compatible with the monomer units; and most importantly, the two or more polymers in the blend must be melt miscible (i.e., form a homogeneous molten mixture). It is this latter point which distinguishes the criteria for isomorphism in respect to a homopolymer or copolymer alone, and a resin blend. The unpredictability of the isomorphic blends is further demonstrated in the case of PAEs by the fact that isomorphic blends occur in respect to certain relative ketone to ether ratios of the resin making up the blends. For example, a PAE free of ketone will not form an isomorphic mixture with a PAEK containing a ketone to ether ratio of 1:2 or more, and is more prone to form an isomorphic mixture with a PAEK containing a ketone to ether ratio of less than 1:2*.

*Thus, any extension of the "similarity" alluded to by Dawson and Blundell, supra, to isomorphic mixtures is not valid.

The advantages of isomorphic PAE and/or PAEK mixtures are many and varied. To appreciate such advantages, it is necessary to appreciate some of the properties of these isomorphic mixtures.

An isomorphic mixture, melt blended or molded, possesses a single $T_m$. In the case of this invention, the $T_m$ reflects the amount of the various resins employed.

The $T_m$ for the isomorphic mixtures does not fall on a straight line between the $T_m$'s of the resins employed in making the mixture. Invariably, the mixture $T_m$ can be extended to one which is greater than the $T_m$ for the resin with the lowest $T_m$ to about the $T_m$ for the resin with the highest $T_m$. In addition, less than equal amounts of resin with the highest $T_m$ is needed to achieve a mid-point $T_m$ for the isomorphic mixture, which of course is not the case with isomorphism with a random copolymer.

However, another interesting facet of these isomorphic mixtures is that their $T_g$'s (glass transition temperatures) do not behave as characterized above for their $T_m$'s. It is found that the $T_g$'s fall essentially along a straight line between the resins with the highest and lowest $T_m$'s used in the mixture. This provides one with a unique opportunity to more significantly raise the $T_m$ than the $T_g$ and thereby to appreciably increase the delta between $T_m$ and $T_g$ for the mixture over the delta for any of the resins employed in the mixture. Consequently, mixtures can be made with enhanced rates of crystallization thereby allowing one to increase the speed of the molding cycle or to increase the degree of crystallization without annealing. Because lower $T_g$ resins have better molding processability, this delta phenomena in isomorphic mixture provides an opportunity to enhance moldability of a high $T_m$ mixture. An isomorphic PAEK copolymer would not possess such an increased delta between $T_m$ and $T_g$, and as a result, would not possess the molding processability that is possessed by an isomorphic mixture having the same $T_m$.

It is also possible by this invention to provide an isomorphic mixture which, in addition to the property advantages already described, possess enhanced properties with respect to cut-through temperature, resistance to deformation in a no load situation, and enhanced caustic resistance.

DETAILS OF THE INVENTION (a) Classes of PAE resins used in mixtures of the invention:

Broadly speaking, the PAE resins include PAEK resins as well. They are thermoplastic, crystalline and typically have a RV (reduced viscosity) greater than about 0.4 deciliters per gram determined in 96% sulfuric acid at 25° C. using a concentration of 1.0 weight percent polymer solution. The resins comprise 1,4-phenylene units which are separated by ether oxygen and at least one of said resins contains 1,4-phenylene unit separated by a divalent carbonyl radical. The simplest PAE is a resin comprised of units of the formula:

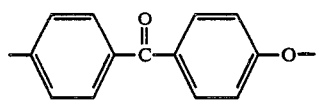

The crystalline poly(aryl ether ketone)s which are suitable for use herein can be generically characterized as containing repeating units of one or more of the following formulae:

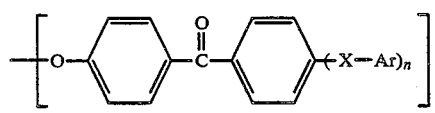
(I)

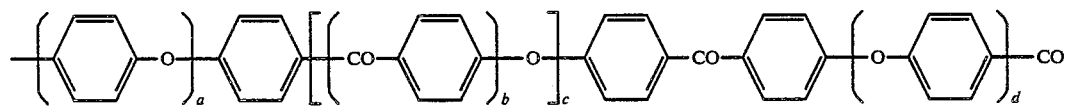
(II)

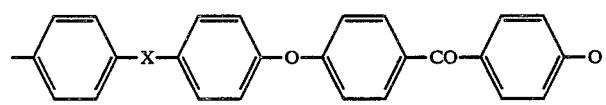
(III)

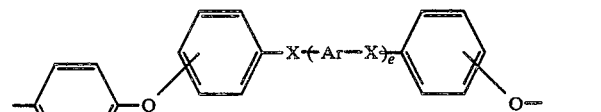
(IV)

(V)

wherein Ar is independently a divalent aromatic radical selected from phenylene, biphenylene or naphthylene, X is independently O, or a direct bond and n is an integer of from 0 to 3, b, c, d and e are 0 to 1 and a is an integer of 1 to 4 and preferably d is 0 when b is 1.
Preferred poly(aryl ketone)s include those having repeating units of the formula:
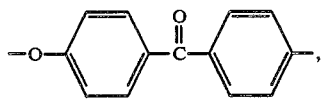
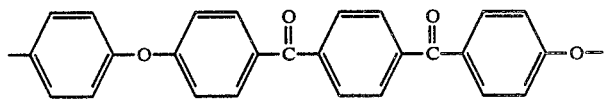
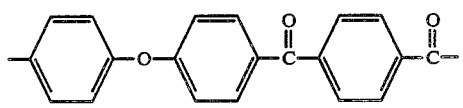
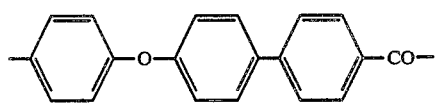
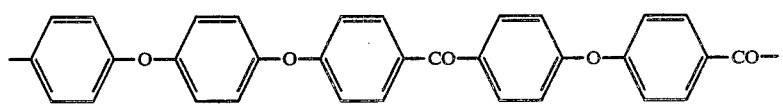
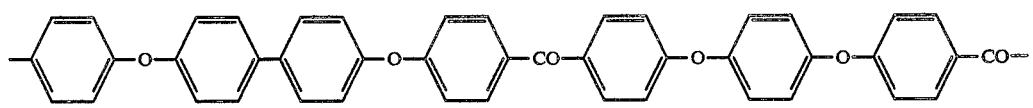
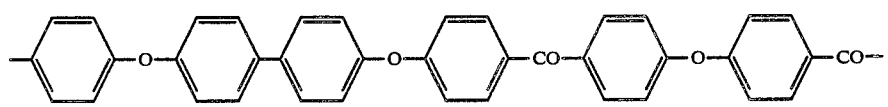
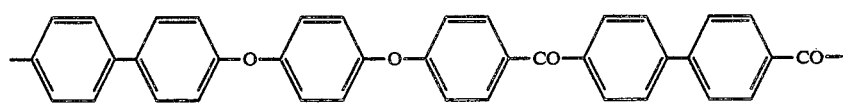
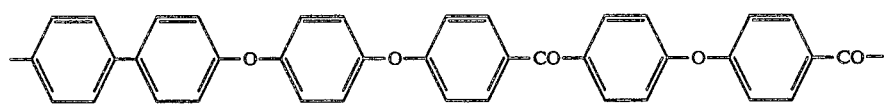
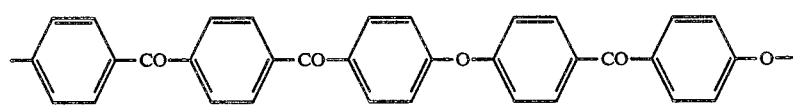

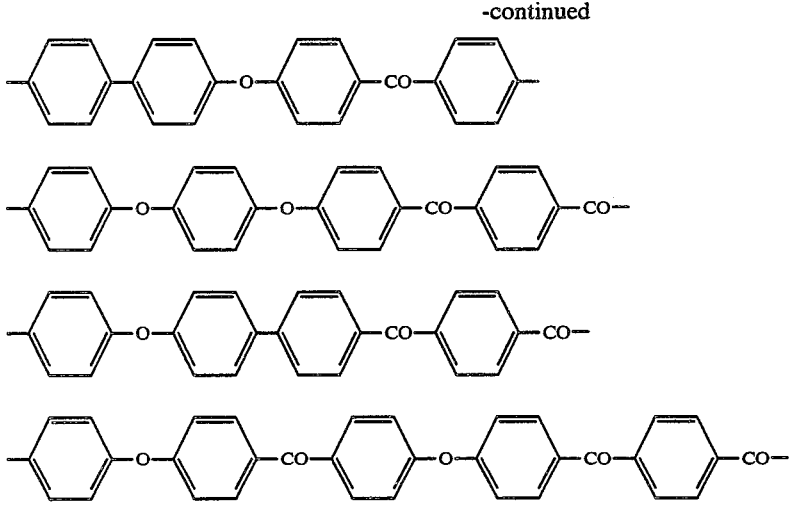

These poly(aryl ketone)s are prepared by methods well known in the art. One such method comprises heating a substantially equimolar mixture of at least one bisphenol and at least one dihalobenzoid compound or at least one halophenol compound. Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and dihalobenzoid compounds include:
4-(4-chlorobenzoyl)phenol,
4,4'-difluorobenzophenone,
4,4'-dichlorobenzophenone,
4-chloro-4'-fluorobenzophenone,

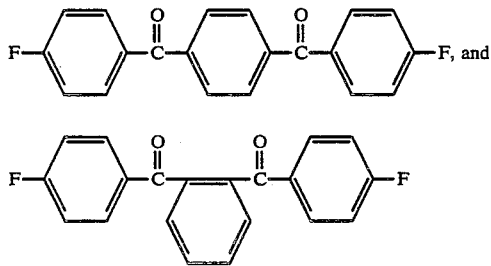

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ketone)s such as those containing repeating units of the formula:

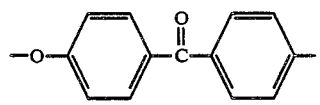

may be produced by Friedel-Craft reactions utilizing hydrogen fluoride-boron trifluoride catalysts as described, for example, in U.S. Pat. No. 3,953,400.

Additionally, poly(aryl ketones) of the following formula:

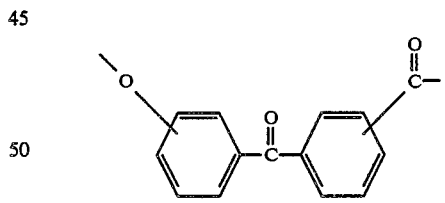

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example U.S. Defensive Publication T 103,703 and U.S. Pat. No. 4,396,755. In such processes, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ether ketone)s of the following formulas:

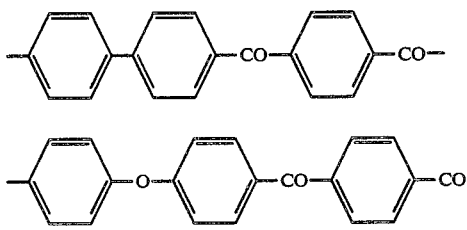

may also be prepared according to the process as described in, for example, U.S. Pat. No. 4,398,020. In such a process, (a) a mixture of substantially equimolar amounts of
(i) at least one aromatic diacyl halide of the formula:

YOC—Ar—COY where —Ar— is a divalent aromatic radical, Y is halogen and COY is an aromatically bound acyl halide group, which diacyl halide is polymerizable with at least one aromatic compound of (a)(ii), and
(ii) at least one aromatic compound of the formula:

H—Ar'—H wherein —Ar'— is a divalent aromatic radical and H is an aromatically bound hydrogen atom, which compound is polymerizable with at least one diacyl halide of (a)(i)
(b) at least one aromatic monoacyl halide of the formula:

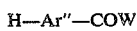

H—Ar''—COW where —Ar''— is a divalent aromatic radical and H is an aromatically bound hydrogen atom, Y is halogen, and COY is an aromatically bound acyl halide group, which monoacyl halide is self-polymerizable, and
(c) a combination of (a) and (b) in the presence of a fluoroalkene sulphonic acid.

The term poly(aryl ketone) as used herein is meant to include homopolymers, copolymers, terpolymers, graft copolymers, and the like. Of particular interest are block copolymers of which a poly(aryl ketone) comprises one of the block structures. The other block could include silicone rubber, polyesters, poly(arylether sulfones), and the like.

The poly(aryl ketone)s have a reduced viscosity of at least about 0.4 to about 5.0 dl/g, as measured in concentrated sulphuric acid at 25° C.

The blends of this invention contain from about 5 to about 95, preferably from about 15 to about 85 weight percent of one poly(aryl ketone) and from about 5 to about 95, preferably from about 15 to about 85 weight percent of a second poly(aryl ketone). Also, the blends may comprise a low molecular weight poly(aryl ketone), i.e. those having a reduced viscosity of from 0.4 to about 1.0, and a high molecular weight poly(aryl ketone), i.e., those having a reduced viscosity of from 1.2 to about 5.0 dl/g as measured in concentrated sulphuric acid at 25° C.

The blends of this invention are prepared by conventional mixing methods. For example, the poly(aryl ketones) are mixed together and with other optional ingredients in powder or granular form in an extruder and the mixture extruded into strands, the strands are chopped into pellets and the pellets molded into the desired article.

The blends of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The composition may also include additives such as titanium dioxide; thermal stabilizers, ultraviolet light stabilizers, plasticizers, and the like.

The blends of this invention may be fabricated into any desired shape, i.e., moldings, coatings, films, or fibers. They are particularly desirable for use as electrical insulation for electrical conductors.

Also, the blends may be woven into monofilament threads which are then formed into industrial fabrics by methods well known in the art as exemplified by U.S. Pat. No. 4,359,501. Further, the blends may be used to mold gears, bearings and the like.

EXAMPLES

The following examples serve to give specific illustrations of the practice of this invention but they are not intended in any way to limit the scope of this invention.

CONTROL A

Pellets of a poly(aryl ketone) of the formula (PAEK I)

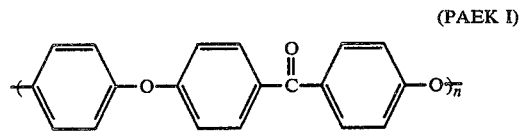

(having an R.V. of 1.2 dl/g as measured in 96% $H_2SO_4$ at 25° C., 1 wt. % polymer solution) were molded into a 4×4×0.020 inch plaque in a cavity mold at 380° C. The molding was done in a South Bend hydraulic press with heated platens. After pressing the plaque, the mold was cooled over a period of about 5 minutes to room temperature by passing water through the platens. The molded plaque was shear cut into ⅛ inch wide strips. These strips were tested for 1% secant modulus according to a procedure similar to ASTM D-638, tensile strength and elongation at break according to ASTM D-638, and pendulum impact strength [(pendulum impact strength is measured as follows: A steel pendulum is used, cylindrical in shape with a diameter of 0.83 inch and weighing 1.562 pounds; the striking piece, mounted almost at the top of the pendulum is a cylinder 0.3 inch in diameter; film specimens, 4 inches long, 0.125 inch wide and about 1 to 30 mils thick are clamped between the jaws of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the difference in the recovery height (i.e., the difference in the potential energy of the pendulum at the maximum point of the upswing) represent the energy absorbed by the specimen during the rupture; the impact strength, expressed in foot-pounds per cubic inch, is obtained by dividing the pendulum energy loss by the volume of the specimen]. The results are shown in Table I.

Samples of the molded plaque were placed in a Perkin-Elmer DSC-2B calorimeter. The melting point, Tm, and heat of fusion, ΔHm, were measured by methods well known in the art by scanning at 10° C./min. The melting point was taken at the maximum in the melting endotherm. The sample was then cooled at 10° C./min and the crystallization temperature, Tc, and heat of crystallization ΔHc, were measured by methods well known in the art. The crystallization temperature was taken as the maximum in the crystallization exotherm. The sample was next heated rapidly (~160° C./min) to above its melting point to about 400° C. It was next cooled at about 160° C./min to a specified temperature below its melting point and held there. The crystallization time, tc, at this specified temperature was recorded as the time elapsed between when the cooling was initiated and when the maximum in the crystallization rate occurred. The results are shown in Table I.

The glass transition temperature was also determined on amorphous samples by DSC as follows: A sample of the molded plaque was placed in a DSC pan, heated above its $T_m$ (about 400° C.) and then cooled rapidly to room temperature to prevent crystallization. The sample was then heated at 10° C./min. and the Tg determined by the onset of the discontinuity in the specific heat. The result is shown in Table I.

CONTROL B

A poly(aryl ketone) of the formula

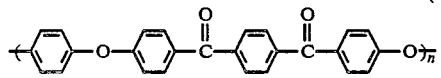

(PAEK II)

(having an R.V. of 1.15–1.26 dl/g as measured in 96% $H_2SO_4$ at 25° C., 1 wt % polymer solution) was molded into 4×4×0.020 inch plaques at 400° C. by the procedure described in Control A. The plaques were tested by the procedures described in Control A. The results are shown in Table I.

EXAMPLE 1

75 parts by weight of the poly(aryl ketone) of Control B and 25 parts by weight of the poly(aryl ketone) of Control A were mixed in a Brabender Plasticorder blender at about 380° C. The mixture was molded into 4×4×0.020 inch plaques at about 400° C. by the procedure described in Control A. The plaques were tested by the procedure described in Control A. The results are shown in Table I.

EXAMPLE 2

50 parts by weight of the poly(aryl ketone) of Control B and 50 parts by weight of the poly(aryl ketone) of Control A were mixed in a Brabender Plasticorder blender at about 380° C. The mixture was molded into 4×4×0.020 inch plaques at about 400° C. by the procedure described in Control A. The plaques were tested by the procedure described in Control A. The results are shown in Table I.

EXAMPLE 3

24 parts by weight of a poly(aryl ketone) identical to Control B (except with an R.V. of 1.34 dl/g as measured in 96% $H_2SO_4$ at 25° C., 1 wt % polymer solution) and 76 parts by weight of the poly(aryl ketone) of Control A were mixed in a Brabender Plasticorder blender at about 380° C. The mixture was molded into 4×4×0.020 inch plaques at about 400° C. by the procedure described in Control A. The plaques were tested by the procedure described in Control A. The results are shown in Table I.

The mechanical properties and crystallization times of the blends are shown in Table I as a function of composition. The blends show toughness, strength, moduli, and rates of crystallization that suggest their use in extruded sheet, film, coatings, and injection molded articles.

The single glass transition temperature that varies between the Tgs of the constituents is an indication that these blends are thermodynamically miscible in the amorphous phase. The blends also show a single melting point that varies with composition as shown in Table I. This is evidence that the blends are isomorphic, that is they exist in one phase in the crystalline state.

EXAMPLE 4

50 parts by weight of the poly(aryl ketone) of Control A and 50 parts by weight of the poly(aryl ketone) of Control B were mixed in a Brabender Plasticorder blender at about 380° C. The mixture was molded into a 4×4×0.020 inch plaque in a cavity mold at about 400° C. After pressing, the sample was cooled to room temperature over a period of five minutes by passing water through the press platens. A piece of the plaque weighing about 10 milligrams were placed in a Dupont Model 990 Thermal Analyzer equipped with a DSC pressure cell and heated at 10° C./min from room temperature to 400° C. The resulting thermogram showed a single melting point at 363° C.

EXAMPLE 5

A 4×4×0.020 inch plaque of the poly(aryl ketone) of Control A and a 4×4×0.020 inch plaque of the poly(aryl ketone) of Control B were molded by the procedure described in Example 4. 6.24 parts by weight of the plaque of Control A and 6.65 parts by weight of the plaque of Control B were placed together but substantially unmixed in a Dupont Model 990 Thermal Analyzer equipped with a DSC pressure cell and heated at 10° C./min from room temperature to 400° C. The resulting thermogram showed two melting points at 336° C. and 363° C.

A mixture of the poly(aryl ketone)s of Control A and Control B, in which the respective crystalline domains exist in distinct phases, exhibits two Tms. However, after melt mixing at about 380° C., the mixture exhibits a single Tm. This is evidence that a single crystalline phase exists. Also the total ΔHf exhibited by Example 5 (11.6 calories/gram) was very similar to that of Example 4 (13.2 calories/gram). Consequently, the level of crystallinity was not greatly affected by melt blending, and possibly even enhanced.

CONTROL C

A poly(aryl ketone) of the formula

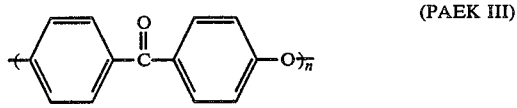

(PAEK III)

(having an R.V. of 1.92 dl/g as measured in 96% H$_2$SO$_4$ at 25° C., 1 wt % polymer solution) was molded into 4×4×0.020 inch plaques at about 400° C. by the procedure described in Control A. The plaques were tested by the procedure described in Control A. The results are shown in Table II.

EXAMPLE 6 50 parts by weight of the poly(aryl ketone) of Control A and 50 parts by weight of the poly(aryl ketone) of Control C were mixed in a Brabender Plasticorder blender at about 380° C. The mixture was molded into 4×4×0.020 inch plaques at about 400° C. The plaques were tested by the procedure described in Control A and the results are shown in Table II.

The mechanical properties and crystallization times for the blend shown in Table II suggest its use in extruded sheet, film and coatings, and injection molded articles. The single Tg of the blend occurring between the Tgs of its constituents coupled with the single observed melting point suggest that blends of these two poly(aryl ketones) are also miscible and isomorphic.

CONTROL D

A poly(aryl ketone) of the formula

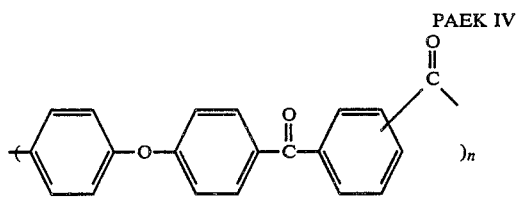

PAEK IV containing 70% para and 30% metal linkages (having an R.V. of 1.0 dl/g as measured in 96% H$_2$SO$_4$ at 25° C., 1 wt % polymer solution) was molded into 4×4×0.020 inch plaques by the procedure described in Control A. The plaques were tested by the procedure described in Control A. The results are shown in Table III.

EXAMPLE 7

84 parts by weight of the poly(aryl ketone) of Control A and 16 parts by weight of a poly(aryl ketone) identical to Control D (except with a R.V. of 1.1 dl/g as measured in 96% H$_2$SO$_4$, 1 wt % polymer solution) were mixed at about 380° C. in a Brabender Plasticorder blender. The mixture was molded into 4×4×0.020 inch plaques at about 400° C. by the procedure described in Control A. The plaques were tested by the procedure described in Control A. The results are shown in Table III.

CONTROL E

A poly(aryl ether ketone) similar to Control D but with 100% para linkages (having an R.V. of 1.12 dl/g) was molded into 4×4×0.020 inch plaques as in Control A at 400° C. The plaque was too brittle to obtain mechanical properties, however the thermal properties are shown in Table III.

EXAMPLE 8

80 parts by weight of the poly(aryl ether ketone) of Control A and 20 parts by weight of the poly(aryl ether ketone) of Control E were mixed in a Brabender Plasticorder blender. The mixture was molded into 4×4×0.020 inch plaques at about 400° C. by the procedure described in Control A. The plaques were tested by the procedure described in Control A. The results are shown in Table III.

The existance of two melting points for Example 8 similar to those of the constituents (controls A and E) is evidence that PAEK I and PAEK (IV) are not isomorphic. However, the similarity of properties between Control A and Example 8 shows that the blend is mechanically compatible.

CONTROL F

A poly(aryl ether ketone) of the formula

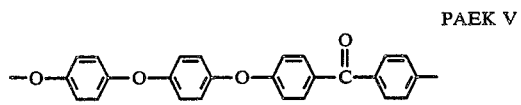

PAEK V (having an R.V of 0.8 dl/g as measured in 96% H$_2$SO$_4$ at 25° C., 1 wt. % polymer solution) was molded into a 4×4×0.020 inch plaque as in Control A. The plaque was too brittle to obtain mechanical properties. However, the thermal properties are given in Table IV.

EXAMPLE 9

60 parts by weight of the PAEK of Control B and 40 parts by weight of the PAEK of Control F were mixed in a Brabender Plasticorder blender at about 380° C. The mixture was molded into 4×4×0.020 inch plaques at about 400° C. The plaques were too brittle to determine physical properties, however, the thermal properties are given in Table IV.

EXAMPLE 10

33⅓ parts by weight of the PAEK of Control A, 33⅓ parts by weight of the PAEK of Control B and 33⅓ parts by weight of the PAEK of Control E were mixed in a Brabender Plasticorder blender at about 400° C. The mixture was molded into 4×4×0.020 inch plaques at 400° C. by the procedure described in Control A. The plaques were tested by the procedure described in Control A. The results are shown in Table IV. Note that while PAEK I and PAEK IV (e.g. Example 8) are not isomorphous, the ternary blend of PAEK I, PAEK II and PAEK IV (e.g. Example 10) exhibits one melting point, an indication of isomorphic behavior.

CONTROL G

A poly(aryl ether ketone) block copolymer of the following formula

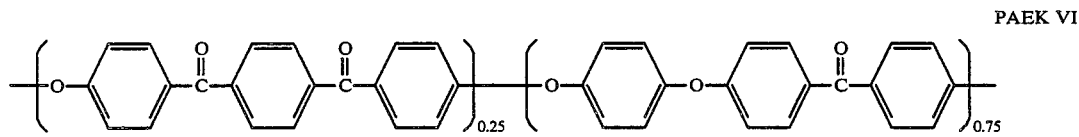

PAEK VI (having an R.V. of 1.0 dl/g as measured in 96% H$_2$SO$_4$ at 25° C., 1 wt. % polymer solution) was made as described in U.S. Patent application and was molded into 4×4×0.020 inch plaques at 400° C. by the procedure described in Control A. The plaques were tested by the procedure described in Control A. The results are shown in Table IV.

EXAMPLE 11

50 parts by weight of the block copolymer of Control G and 50 parts by weight of the polyaryl ketone of Control E were mixed in a Brabender Plasticorder blender at about 400° C. The mixture was molded into 4×4×0.020 inch plaques at about 400° C. by the procedure described in Control A. The plaques were tested by the procedure described in Control A. The results are shown in Table IV.

Note that while PAEK I and PAEK IV are not isomorphic (e.g. Example 8) a blend of PAEK VI (which contains blocks of PAEKs I and IV) and PAEK IV exhibits a single melting point consistent with isomorphic behavior.

CONTROL H

A poly(aryl ether ketone) random copolymer of the formula

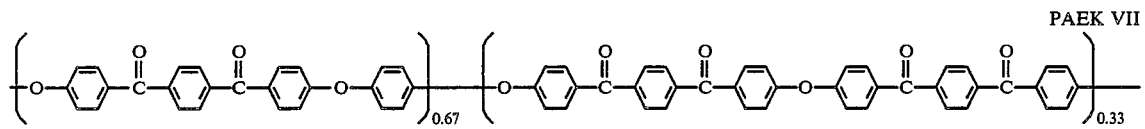

PAEK VII (having an R.V. of 1.25 dl/g as measured in 96% H$_2$SO$_4$ at 25° C., 1 wt. % polymer solution) was molded into 4×4×0.020 inch plaques by the procedure described in Control A at about 400° C. The plaques were tested by the procedure described in Control A. The results are given in Table V.

EXAMPLE 12

50 parts by weight of the PAEK of Control A and 50 parts by weight of the PAEK of Control H were mixed in a Brabender Plasticorder blender at about 400° C. The mixture was molded into 4×4×0.020 inch plaques at about 400° C. by the procedure described in Control A. The plaques were tested by the procedure described in Control A. The results are shown in Table V. Note that Control H and Example 12 have similar melting points. However, Example 12 has much improved physical properties that Control H. In addition, samples of each were placed in a 20 weight percent sodium hydroxide solution for 24 hours at 200° C. The weight change due to this exposure is shown in Table V. Example 12 showed no change after this exposure while Control H lost 1.3% of its initial weight due to chemical attack. This demonstrates how isomorphic behaviour can be used to produce a blend with improved physical properties and chemical resistance than that of a copolymer having a similar melting point.

TABLE I

PROPERTIES OF PAEK I/PAEK II BLENDS

| Example | Description of the Composition Polymer | Wt % | 1% Secant Modulus (PSI) | Tensile Strength (PSI) | Elongation at Break (%) | Pendulum Impact Strength (ft-lb/in$^3$) | Tm (°C.) | ΔH$_f$ (Cal/g) | Tc (°C.) | ΔH$_c$ (Cal/g) |
|---|---|---|---|---|---|---|---|---|---|---|
| Control A | PAEK I | 100 | 391,000 | 13,300 | 33 | 170 | 336–339 | 9.4–11.2 | 300 | 11.3 |
| Example 1 | PAEK I | 25 | 410,000 | 13,900 | 7.0 | 94 | 364 | 8.5 | 319 | 11.8 |
|  | PAEK II | 75 |  |  |  |  |  |  |  |  |
| Example 2 | PAEK I | 50 | 415,000 | 13,800 | 6.3 | 105 | 362 | 7.4 | 311 | 11.4 |
|  | PAEK II | 50 |  |  |  |  |  |  |  |  |
| Example 3 | PAEK I | 76 | 391,580 | 13,480 | 7.4 | 80–>300 | 348 | 12.6–14.8 | 280 | 10.2 |
|  | PAEK II | 24 |  |  |  |  |  |  |  |  |
| Control B | PAEK II | 100 | 400,000 | 14,600 | 7.2 | 10–86 | 364 | 9.0 | 323 | 13.2 |

| | CRYSTALLIZATION TIMES (Tc, SECONDS) | | | | | | | | |
|---|---|---|---|---|---|---|---|---|---|
| Example | 340° C. | 330° C. | 320° C. | 310° C. | 300° C. | 290° C. | 280° C. | 270° C. | Tg° C. |
| Control A | — | — | — | 145 | 59 | 42 | 37 | — | 141 |
| Example 1 | — | 195 | 84 | 57 | 52 | — | — | — | 146 |
| Example 2 | — | 465 | 170 | 84 | 66 | — | — | — | 143 |
| Example 3 | — | — | — | — | 415 | 188 | 113 | 86 | — |

TABLE I-continued
PROPERTIES OF PAEK I/PAEK II BLENDS

| | | | | | | | | | |
|---|---|---|---|---|---|---|---|---|---|
| Control B | 500 | 134 | 66 | 50 | — | — | — | — | 150 |

TABLE II
PROPERTIES OF PAEK I/PAEK III BLENDS

| | Description of the Composition | | 1% Secant Modulus | Tensile Strength | Elongation at Break | Pendulum Impact Strength | Tm | $\Delta H_f$ | Tc | $\Delta H_c$ |
|---|---|---|---|---|---|---|---|---|---|---|
| Example | Polymer | Wt % | (PSI) | (psi) | % | (ft-lb$_f$/in$^3$) | (°C.) | (Cal/g) | (°C.) | (Cal/g) |
| Control A | PAEK I | 100 | 391,000 | 13,300 | 33 | 170 | 336–339 | 9.4–11.2 | 300 | 11.3 |
| Example 6 | PAEK I | 50 | 349,000 | 12,600 | 20 | 116 | 360 | 6.9 | 313 | 8.5 |
| | PAEK III | 50 | | | | | | | | |
| Control C | PAEK III | 100 | 373,000 | 12,000 | 31 | 123 | 366 | 6.3 | 324 | 10.8 |

| | CRYSTALLIZATION TIMES (tc, SECONDS) | | | | | | | | |
|---|---|---|---|---|---|---|---|---|---|
| Example | 340° C. | 330° C. | 320° C. | 310° C. | 300° C. | 290° C. | 280° C. | 270° C. | Tg° C. |
| Control A | — | — | — | 145 | 59 | 42 | 37 | — | 141 |
| Example 6 | — | 340 | 122 | 68 | 54 | — | — | — | 144 |
| Control C | 180 | 75 | <60 | — | — | — | — | — | 152 |

TABLE III
PROPERTIES OF PAEK I/PAEK IV BLENDS

| | Description of the Composition | | 1% Secant Modulus | Tensile Strength | Elongation at Break | Pendulum Impact Strength | Tm | $\Delta H_f$ | Tc | $\Delta H_c$ |
|---|---|---|---|---|---|---|---|---|---|---|
| Example | Polymer | Wt % | (PSI) | (psi) | % | (ft-lb$_f$/in$^3$) | (°C.) | (°C.) | (Cal/g) | (°C.) |
| Control A | PAEK I | 100 | 391,000 | 13,300 | 33 | 170 | 336–339 | 9.4–11.2 | 300 | 11.3 |
| Example 7 | PAEK I | 84 | 415,000 | 14,600 | 15 | 137 | 337 | 8.6 | 294 | 11.4 |
| | PAEK IV | 16 | | | | | | | | |
| Control D | PAEK IV | 100 | 399,000 | 9,150 | 2.5 | 7 | — | — | — | — |
| Control E | PAEK IV | 100 | — | — | — | — | | | | |
| Example 8 | PAEK I | 80 | 350,000 | 13,000 | 8.5 | 93 | 337 & 385 | 5.4 & 1.0 | 343 & 302 | 1.6 & 6.1 |
| | PAEK IV | 20 | | | | | | | | |

| | CRYSTALLIZATION TIMES (tc, SECONDS) | | | | | | | | |
|---|---|---|---|---|---|---|---|---|---|
| Example | 340° C. | 330° C. | 320° C. | 310° C. | 300° C. | 290° C. | 280° C. | 270° C. | Tg° C. |
| Control A | — | — | — | 145 | 59 | 42 | 37 | — | 141 |
| Example 7 | — | — | — | 345 | 112 | 63 | — | — | 145 |
| Control D | — | — | — | — | — | — | — | — | — |
| Control E | | | | | | | | | 165 |
| Example 8 | 67 | 45 | — | — | — | — | — | — | — |

TABLE IV
PROPERTIES OF PAEK I/PAEK V AND PAEK I/PAEK VI BLENDS

| | Description of the Composition | | 1% Secant Modulus | Tensile Strength | Elongation at Break | Pendulum Impact Strength | Tm | $\Delta H_f$ | Tc | $\Delta H_c$ |
|---|---|---|---|---|---|---|---|---|---|---|
| Example | Polymer | Wt % | (PSI) | (psi) | % | (ft-lb$_f$/in$^3$) | (°C.) | (°C.) | (Cal/g) | (°C.) |
| Control A | PAEK I | 100 | 391,000 | 13,300 | 33 | 170 | 336–339 | 9.4–11.2 | 300 | 11.3 |
| Control B | PAEK II | 100 | 400,000 | 14,600 | 7.2 | 10–86 | 364 | 9.0 | 323 | 13.2 |
| Control E | PAEK IV | 100 | | | | | | | | |
| Example 9 | PAEK II | 60 | — | — | — | — | 362 | 6.8 | 306 | 9.5 |
| | PAEK V | 40 | | | | | | | | |
| Control F | PAEK V | 100 | — | — | — | — | 317 | 8.9 | 261 | 10.1 |
| Example 10 | PAEK I | 33.3 | — | — | — | — | 387 | 2.7 | 299 | 5.7 |
| | PAEK II | 33.3 | | | | | | | | |
| | PAEK IV | 33.3 | | | | | | | | |
| Control G | PAEK VI | 100 | 285,000 | 11,600 | 4.7 | 3.6 | 347 | 7.1 | 307 | 8.3 |
| Example 11 | PAEK IV | 50 | 380,000 | 14,600 | 12 | 12 | 384 | 5.4 | 323 | 4.8 |
| | PAEK VI | 50 | | | | | | | | |

| | CRYSTALLIZATION TIMES (tc, SECONDS) | | | | | | | | |
|---|---|---|---|---|---|---|---|---|---|
| Example | 340° C. | 330° C. | 320° C. | 310° C. | 300° C. | 290° C. | 280° C. | 270° C. | Tg° C. |
| Control A | | | | 145 | 59 | 42 | 37 | | 145 |
| Control B | 500 | 134 | 66 | 50 | — | — | — | — | 145 |
| Control E | | | | | | | | | |
| Example 9 | — | — | 220 | 123 | 90 | — | — | — | 143 |
| Control F | — | — | — | — | — | — | 675 | 290 | 127 |
| Example 10 | — | — | — | 280 | 185 | 135 | — | — | — |

TABLE IV-continued
PROPERTIES OF PAEK I/PAEK V AND PAEK I/PAEK VI BLENDS

| | | | | | | | | | |
|---|---|---|---|---|---|---|---|---|---|
| Control G | — | — | 263 | 105 | 67 | — | — | — | — |
| Example 11 | 385 | 105 | 105 | — | — | — | — | — | — |

TABLE V
PROPERTIES OF A TYPICAL ISOMORPHIC PAEK BLEND IN COMPARISON TO THOSE OF ITS CONSTITUENTS

| Example | Control H | Example 12 | Control A |
|---|---|---|---|
| Composition | 100% PAEK VII | 50% PAEK I 50% PAEK VII | 100% PAEK I |
| R.V. (dl/g) | 1.25 | 1.20 | 1.20 |
| Tensile Strength (psi) | 11000.00 | 14400.0 | 12300.00 |
| Tensile Modulus kpsi @ 23° C. | 400.00 | 411.00 | 384.00 |
| Tensile Modulus kpsi @ 250° C. | 45.00 | 26.0 | 25.0 |
| Elongation (%) | 5.00 | 9.0 | 40.00 |
| Pendulum Impact (ft-lb/in 3) | 30.00 | 71.0 | 130.00 |
| Tm(C) | 374.00 | 372.0 | 337.00 |
| DHf (cal/g) | 7.60 | 2.8 | 8.20 |
| Tc(C) | 333.00 | 322.0 | 291.00 |
| DHc(cal/g) | 11.80 | 9.5 | 10.00 |
| tc @ 350 C. | 510 | — | — |
| tc @ 340 C. | 119 | 385 | — |
| tc @ 330 C. | 59 | 150 | — |
| tc @ 320 C. | — | 83 | — |
| tc @ 310 C. | — | — | 540 |
| tc @ 300 C. | — | — | 150 |
| tc @ 290 C. | — | — | 81 |
| Weight Loss (%) after 24 hours at 200° C. in 20% NAOH | 1.3 | 0 | Not tested |

We claim:

1. A poly(aryl ether) resin blend comprising from about 5 to about 95 weight percent of at least two separately made crystalline poly(aryl ether) resins formed into an intimate moldable mixture, each resin having, prior to being formed into said mixture (i) a different crystalline melting temperature and a different glass transition temperature, or (ii) a different molecular arrangement of unit components each resin comprising 1,4-phenylene units separated by either oxygen and at least one of said resins containing 1,4-phenylene units separated by a divalent carbonyl radical; and poly(aryl ether) resins each having a reduced viscosity of at least about 0.4 to about 5.0 dl/g as determined in concentrated sulfuric acid at 25° C. using a concentration of 1.0 weight percent polymer solution.

2. A blend as defined in claim 1 wherein the poly(aryl ethers) are poly(arylether ketones).

3. A blend as defined in claim 2 wherein at least one poly(aryl ether ketone) has a repeating unit of the following formula:

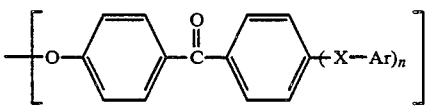

wherein Ar is independently a divalent aromatic radical selected from phenylene, biphenylene or naphthylene, X is independently O,

or a direct bond and n is an integer of from 0 to 3.

4. A blend as defined in claim 3 wherein at least one poly(aryl ether ketone) has a repeating unit of the following formula:

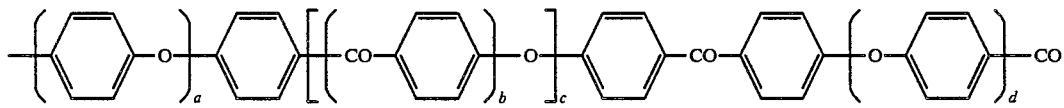

wherein a is an integer of 1 to 4 and b, c, and d are 0 to 1.

5. A blend defined in claim 2 wherein at least one poly(aryl ether ketone) has a repeating unit of the following formula:

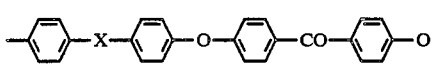

wherein x is independently O,

or a direct bond.

6. A blend as defined in claim 2 wherein at least one poly(aryl ether ketone) has a repeating unit of the following:

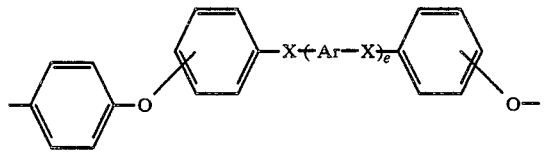

wherein Ar is a divalent aromatic radical selected from phenylene, biphenylene or naphthylene, X is independently O,

or a direct bond and e is 0 or 1.

7. A blend as defined in claim 2 wherein at least one poly(aryl ether ketone) has a repeating unit of the following formula:

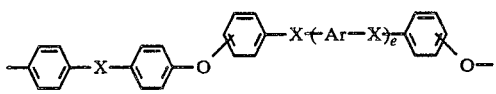

wherein Ar is a divalent aromatic radical selected from phenylene, biphenylene or naphthylene, X is independently O,

or a direct bond and e is 0 or 1.

8. A blend defined in claim 2 wherein at least one poly(aryl ether ketone) has repeating units of the formula:

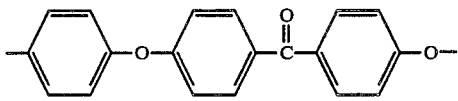

9. A blend as defined in claim 2 wherein at least one poly(aryl ether ketone) has repeating units of the formula:

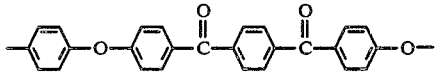

10. A blend as defined in claim 2 wherein at least one poly(aryl ether ketone) has repeating units of the formula:

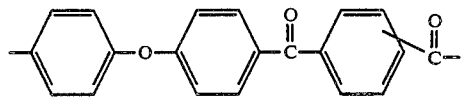

where the ratio of para to meta linkages may vary from 100:0 to 50:50.

11. A blend as defined in claim 2 wherein at least one poly(aryl ether ketone) has repeating units of the formula:

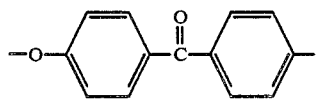

12. A blend of the poly(aryl ether ketones) of claims 8 and 9.
13. A blend of the poly(aryl ether ketones) of claims 8 and 10.
14. A blend of the poly(aryl ether ketones) of claims 8 and 11.
15. A blend of the poly(aryl ether ketones) of claims 9 and 10.
16. A blend of the poly(aryl ether ketones) of claims 9 and 11.
17. A blend of the poly(aryl ether ketones) of claims 10 and 11.
18. A blend as defined in claim 2 wherein at least one poly(aryl ether ketone) is a constituent of a block copolymer.
19. A blend as defined in claim 1 wherein one poly(aryl ether ketone) has a reduced viscosity of from 0.4 to 1.0 and the second polyarylether has a reduced viscosity of from 1.2 to 5.0 dl/g as measured in concentrated sulfuric acid at 25° C.
20. A blend as defined in claim 1 wherein the poly(aryl ether ketone) has repeating units of at least one formula:

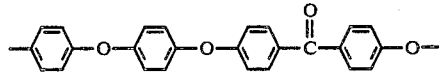

21. An article molded from the blends of claims 1 to 20.
22. A blend as defined in claim 1 which is isomorphic.
23. A blend as defined in claim 1 which is compatible but not miscible.

* * * * *